United States Patent
Ho et al.

(10) Patent No.: US 11,443,907 B2
(45) Date of Patent: Sep. 13, 2022

(54) ILLUMINATED KEYBOARD AND BACKLIGHT MODULE THEREOF

(71) Applicant: CHICONY POWER TECHNOLOGY CO., LTD., New Taipei (TW)

(72) Inventors: Hsuan-Wei Ho, New Taipei (TW); Tsung-Hsun Chen, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/100,397

(22) Filed: Nov. 20, 2020

(65) Prior Publication Data
US 2022/0044889 A1    Feb. 10, 2022

(30) Foreign Application Priority Data

Aug. 5, 2020 (TW) ................. 109126509

(51) Int. Cl.
| | |
|---|---|
| *G06F 3/02* | (2006.01) |
| *H01H 13/83* | (2006.01) |
| *F21V 8/00* | (2006.01) |
| *G06F 1/16* | (2006.01) |
| *G06F 3/023* | (2006.01) |

(52) U.S. Cl.
CPC ........... *H01H 13/83* (2013.01); *G02B 6/0068* (2013.01); *G06F 1/1662* (2013.01); *G06F 3/0202* (2013.01); *G06F 3/0237* (2013.01)

(58) Field of Classification Search
CPC ...... H01H 13/83; H01H 13/85; G02B 6/0068; G06F 1/1662; G06F 3/0202; G06F 3/0237; H03M 11/20

USPC .......................................... 200/5 A; 345/170
See application file for complete search history.

(56) References Cited

U.S. PATENT DOCUMENTS

| | | | |
|---|---|---|---|
| 6,785,823 | B1 | 8/2004 | Abrol et al. |
| 10,671,177 | B1 | 6/2020 | Ho et al. |
| 2006/0011461 | A1 | 1/2006 | Chan et al. |
| 2010/0302169 | A1* | 12/2010 | Pance ................ G06F 3/0237 345/170 |

(Continued)

FOREIGN PATENT DOCUMENTS

| | | |
|---|---|---|
| CN | 201812716 U | 4/2011 |
| CN | 104252987 A | 12/2014 |

(Continued)

*Primary Examiner* — Abdul-Samad A Adediran
(74) *Attorney, Agent, or Firm* — Muncy, Geissler, Olds & Lowe, P.C.

(57) ABSTRACT

An illuminated keyboard comprises a first keycap group, a second keycap group, and a backlight module. Each keycap group includes plural keycaps. The backlight module comprises a first light-emitting unit, a second light-emitting unit, a first resistor, a second resistor, a light guide plate, and a circuit board. The light-emitting elements in the first and second light-emitting units are electrically connected to each other in parallel. The first resistor is electrically connected to the first light-emitting unit in series, and the second resistor is electrically connected to the second light-emitting unit in series. The light guide plate is configured with plural through holes, and the circuit board is disposed under the light guide plate. A first total light-emitting area of the first keycap group is not equal to a second total light-emitting area of the second keycap group.

20 Claims, 7 Drawing Sheets

(56) References Cited

U.S. PATENT DOCUMENTS

| | | | | |
|---|---|---|---|---|
| 2012/0162085 A1* | 6/2012 | Mickelsen | ............ | H03M 11/20 345/170 |
| 2014/0138227 A1* | 5/2014 | Chen | ..................... | H01H 13/83 200/5 A |
| 2014/0168087 A1* | 6/2014 | Chen | ..................... | H01H 13/83 345/170 |
| 2018/0337009 A1* | 11/2018 | Yeh | ....................... | G06F 3/0202 |
| 2019/0206641 A1 | 7/2019 | Wang et al. | | |
| 2021/0066005 A1* | 3/2021 | Wu | ....................... | H01H 13/85 |

FOREIGN PATENT DOCUMENTS

| | | | |
|---|---|---|---|
| CN | 109904301 | A | 6/2019 |
| TW | 492258 | B | 6/2002 |
| TW | 200500926 | A | 1/2005 |
| TW | M395210 | U | 12/2010 |
| TW | M416800 | U | 11/2011 |
| TW | M555059 | U | 2/2018 |
| TW | 201816823 | A | 5/2018 |
| TW | 201822383 | A | 6/2018 |
| TW | 201926392 | A | 7/2019 |
| TW | I677000 | B | 11/2019 |

\* cited by examiner

ILLUMINATED KEYBOARD AND BACKLIGHT MODULE THEREOF

CROSS REFERENCE TO RELATED APPLICATIONS

This Non-provisional application claims priority under 35 U.S.C. § 119(a) on Patent Application No(s). 109126509 filed in Taiwan, Republic of China on Aug. 5, 2020, the entire contents of which are hereby incorporated by reference.

BACKGROUND

Technology Field

The present disclosure relates to a keyboard and, in particular, to an illuminated keyboard and a backlight module thereof.

Description of Related Art

The backlight module of the currently popular illuminated keyboard includes four major components, which are disposed under the keyboard and comprise a light shielding plate, a light guide plate (LGP), a reflective plate, and a light bar in order. This type of backlight module configures all the light-emitting elements on the same light bar, and the light bar will be positioned near the center of the backlight module. Thus, the light emitted from the light-emitting elements on the light bar will enter the light guide plate through the sides of the light guide plate, and then be distributed on the back of the keyboard by the light guide plate, thereby forming the backlight of keyboard.

However, the above-mentioned illuminated keyboard has the disadvantages that the keyboard is thick and the light uniformity is bad. Accordingly, another light-emitting module is introduced to solve these problems. In this case, the light-emitting elements are installed on the circuit board, and a plurality of components are stacked to form the keyboard. The stacked components include the keycaps, scissor switches, metal plate, black matrix (BM), light guide plate, reflective plate, and circuit board. Since the minimum thickness of the commercial LED of the light-emitting component is about 0.15 mm, it is needed to consider the proper design for decreasing the entire thickness and increasing the luminance and light uniformity.

In addition, the current illuminated keyboard is configured with resistors to control the luminance of the overall backlight module. In general, if there are N light-emitting elements, N resistors are provided to respectively control the luminance of the light-emitting elements so as to control the overall luminance. However, when the number of light-emitting elements is large, the cost of the required components (e.g. resistors) will increase, thereby losing the cost advantage of the products.

Therefore, it is desired to provide a novel illuminated keyboard design that can decrease the entire thickness, effectively minimize the number of components for decreasing the power consumption and component cost, improve the luminance of keyboard, and/or provide an uniform light distribution.

SUMMARY

In view of the foregoing, this disclosure is to provide an illuminated keyboard and a backlight module. Compared with the conventional art, the illuminated keyboard and the backlight module of this disclosure have a novel structure and circuit design in cooperated with the corresponding control method, thereby achieving a thinner profile, an increased luminance, and more uniform light coupling. Accordingly, this disclosure can decrease the power consumption and achieve the effect of thin structure.

To achieve the above, this disclosure provides an illuminated keyboard, which comprises a first keycap group, a second keycap group and a backlight module. Each of the first keycap group and the second keycap group comprises a plurality of keycaps. The backlight module comprises a first light-emitting unit, a second light-emitting unit, a first resistor, a second resistor, a light guide plate and a circuit board. The first light-emitting unit comprises a plurality of light-emitting elements, and the light-emitting elements of the first light-emitting unit are disposed under the keycaps of the first keycap group, respectively. The light-emitting elements of the first light-emitting unit are electrically connected to each other in parallel. The second light-emitting unit comprises a plurality of light-emitting elements, and the light-emitting elements of the second light-emitting unit are disposed under the keycaps of the second keycap group, respectively. The light-emitting elements of the second light-emitting unit are electrically connected to each other in parallel. The first resistor is electrically connected to the first light-emitting unit in series, and the second resistor is electrically connected to the second light-emitting unit in series. The light guide plate is configured with a plurality of through holes. The circuit board is disposed under the light guide plate, and the first light-emitting unit, the second light-emitting unit, the first resistor and the second resistor are disposed on the circuit board. A first total light-emitting area of the first keycap group is not equal to a second total light-emitting area of the second keycap group.

In one embodiment, when the first total light-emitting area is less than the second total light-emitting area, a first current flowing through the light-emitting elements of the first light-emitting unit is greater than a second current flowing through the light emitting-elements of the second light-emitting unit.

In one embodiment, when the first total light-emitting area is less than the second total light-emitting area, a resistance value of the first resistor is less than a resistance value of the second resistor.

In one embodiment, when the first total light-emitting area is less than the second total light-emitting area, an average luminance of the light-emitting elements of the first light-emitting unit is greater than an average luminance of the light-emitting elements of the second light-emitting unit.

In one embodiment, an amount of the light-emitting elements in the first light-emitting unit or the second light-emitting unit is greater than an amount of the resistors connecting to the light-emitting elements in series.

In one embodiment, each of the light-emitting elements comprises a plurality of light outputting surfaces perpendicular to a top surface of the corresponding keycap.

In one embodiment, the light outputting surfaces comprise a first light outputting surface, a normal direction of the first light outputting surface and a side of the corresponding keycap form an acute angle, and the acute angle is between 35° and 60°.

In one embodiment, the illuminated keyboard further comprises a bottom plate disposed under the first keycap group and the second keycap group. The bottom plate is configured with a plurality of openings corresponding to the keycaps and the light-emitting elements, respectively, and the through holes correspond to the openings, respectively. The backlight module further comprises a light shielding plate, which comprises a planar region and a plurality of convex regions. The planar region is disposed between the bottom plate and the light guide plate, and the convex regions correspond to the openings, respectively. The light-emitting elements of the first light-emitting unit and the second light-emitting unit are accommodated in accommodating spaces defined by the openings, the through holes and the convex regions, respectively.

In one embodiment, a reflection portion is provided between the light-emitting element and the convex region, and the reflection portion is disposed above the light-emitting element for reflecting light emitted from the light-emitting element.

In one embodiment, the circuit board comprises a reflective layer facing the light guide plate for reflecting a part of light emitted from the light-emitting element to the light guide plate, and the reflective layer is exposed from the through hole.

In addition, this disclosure also provides a backlight module, which comprises a light guide plate, a first light-emitting unit, a second light-emitting unit, a first resistor, a second resistor, a circuit board and a light shielding plate. The light guide plate comprises a side, a first backlight region and a second backlight region. Each of the first backlight region and the second backlight region comprises a plurality of keycap backlight areas, and each of the keycap backlight areas is configured with a through hole. The first light-emitting unit comprises a plurality of light-emitting elements, which are disposed corresponding to the through holes in the keycap backlight areas of the first backlight region, respectively. The light-emitting elements of the first light-emitting unit are electrically connected to each other in parallel. The second light-emitting unit comprises a plurality of light-emitting elements, which are disposed corresponding to the through holes in the keycap backlight areas of the second backlight region, respectively. The light-emitting elements of the second light-emitting unit are electrically connected to each other in parallel. The first resistor is electrically connected to the first light-emitting unit in series, and the second resistor electrically connected to the second light-emitting unit in series. The circuit board is disposed under the light guide plate, and the first light-emitting unit, the second light-emitting unit, the first resistor and the second resistor are disposed on the circuit board. The light shielding plate comprises a planar region and a plurality of convex regions. The planar region is configured with a plurality of openings for outputting light, and the light-emitting elements are disposed corresponding to the convex regions, respectively. A first total area of the openings corresponding to the keycap backlight areas of the first backlight region is not equal to a second total area of the openings corresponding to the keycap backlight areas of the second backlight region.

In one embodiment, when the first total area is less than the second total area, a first current flowing through the light-emitting elements of the first light-emitting unit is greater than a second current flowing through the light emitting-elements of the second light-emitting unit.

In one embodiment, when the first total area is less than the second total area, a resistance value of the first resistor is less than a resistance value of the second resistor.

In one embodiment, when the first total area is less than the second total area, an average luminance of the light-emitting elements of the first light-emitting unit is greater than an average luminance of the light-emitting elements of the second light-emitting unit.

In one embodiment, an amount of the light-emitting elements in the first light-emitting unit or the second light-emitting unit is greater than an amount of the resistors connecting to the light-emitting elements in series.

In one embodiment, each of the light-emitting elements comprises a plurality of light outputting surfaces perpendicular to an upper surface of the light guide plate.

In one embodiment, the light outputting surfaces comprise a first light outputting surface, a normal direction of the first light outputting surface and the side form an acute angle, and the acute angle is between 35° and 60°.

In one embodiment, a reflection portion is provided between the light-emitting element and the convex region, and the reflection portion is disposed above the light-emitting element for reflecting light emitted from the light-emitting element.

In one embodiment, the light-emitting elements of the first light-emitting unit and the second light-emitting unit protrude from the through holes, respectively, and are accommodated in accommodating spaces defined by the through holes and the convex regions, respectively.

In one embodiment, the circuit board comprises a reflective layer facing the light guide plate for reflecting a part of light emitted from the light-emitting element to the light guide plate, and the reflective layer is exposed from the through hole.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
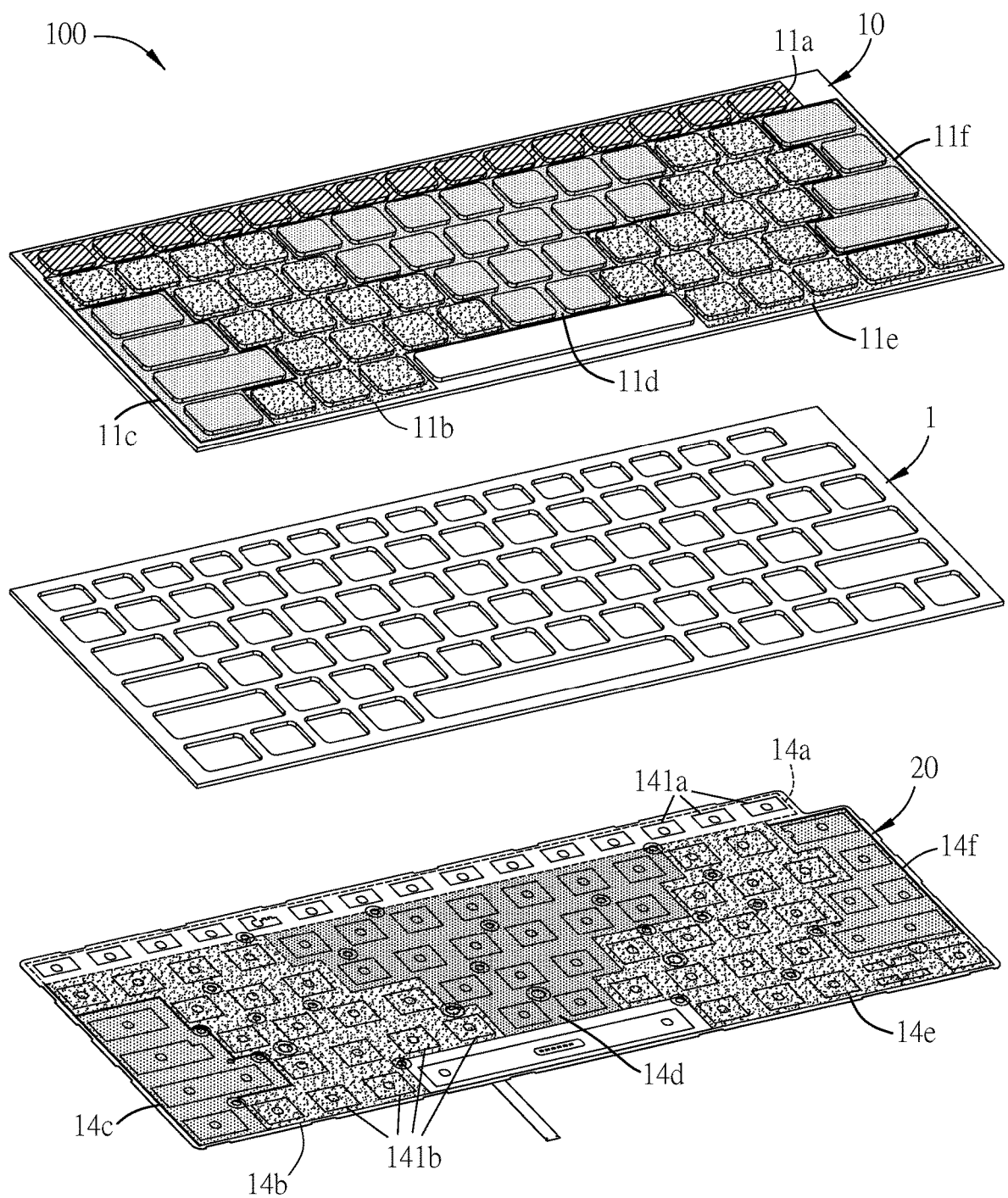
FIG. 1 is a schematic diagram showing an illuminated keyboard according to an embodiment of this disclosure.

As shown in FIG. 1, an illuminated keyboard 100 comprises a keyboard assembly 10, a bottom plate 1, and a backlight module 20.

Figure 2:
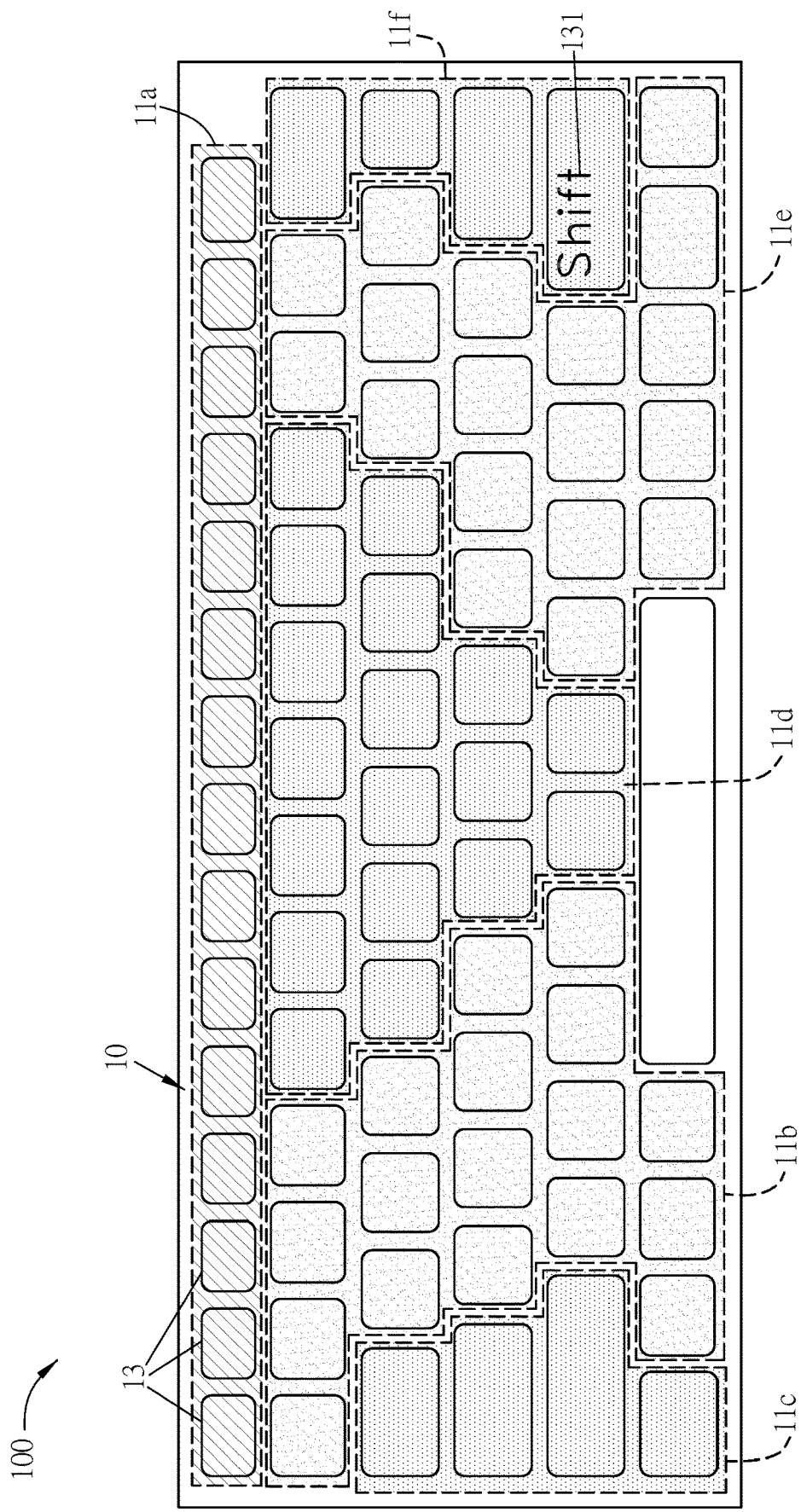
FIG. 2 is a top view of the illuminated keyboard according to an embodiment of this disclosure.
Figure 3:
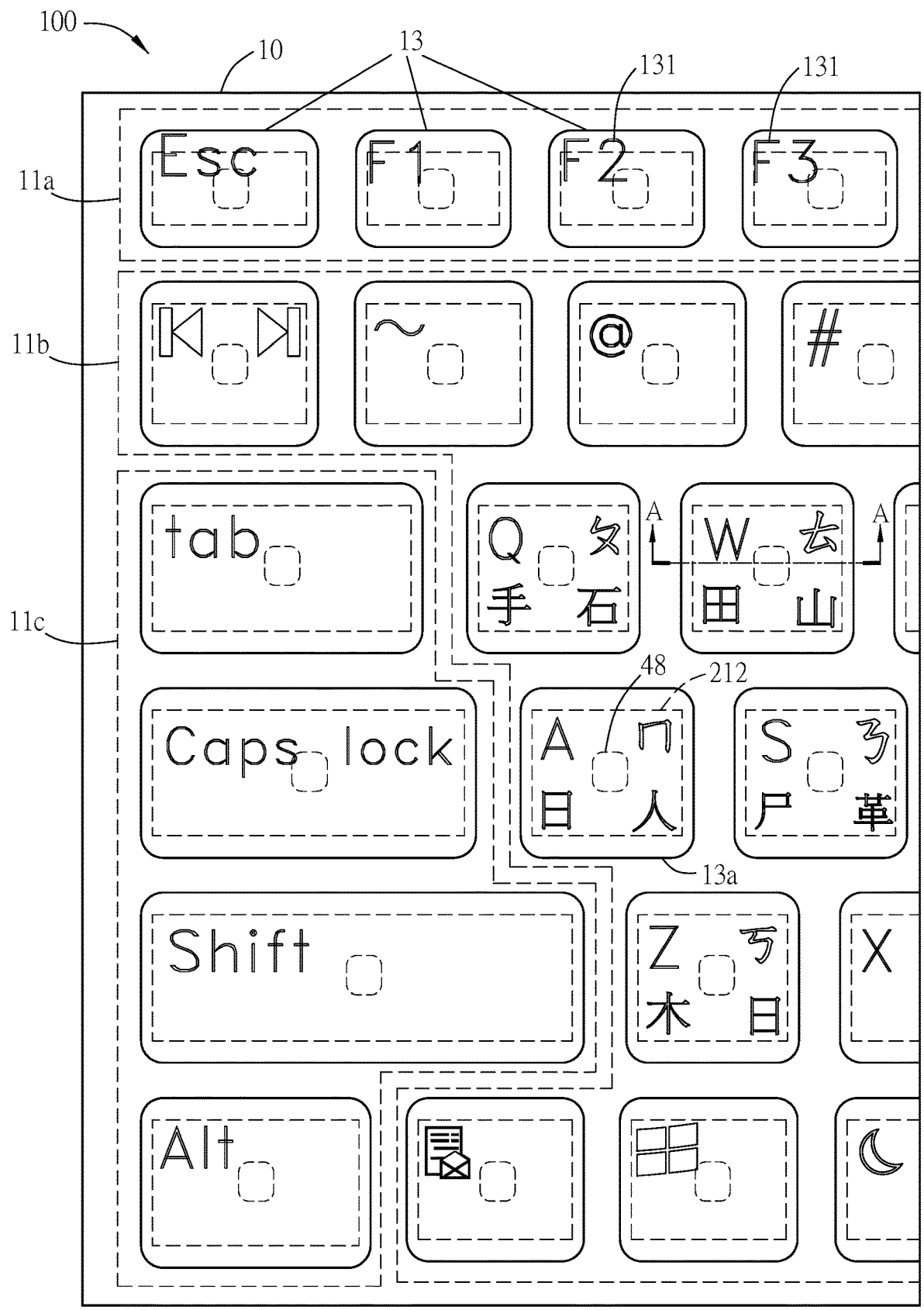
FIG. 3 is a partial enlarged view of the illuminated keyboard according to an embodiment of this disclosure.

FIG. 2 is a top view of the illuminated keyboard according to an embodiment of this disclosure, and FIG. 3 is a partial enlarged view of the illuminated keyboard according to an embodiment of this disclosure. As viewing from the top of the illuminated keyboard 100, the keyboard assembly 10 comprises a plurality of keycaps 13 with different sizes, such as the function keys (F1~F12), the numeric keys, the alphanumeric keys, the enter key, and the likes. In this embodiment, the keyboard assembly 10 comprises a plurality of keycap groups 11a~11f (e.g. the first keycap group 11a and the second keycap group 11b). The first keycap group 11a comprises a function key region, and the second keycap group 11b comprises an alphanumeric key region. Each of the first keycap group 11a and the second keycap group 11b comprises a plurality of keycaps 13. Each keycap 13 is marked or labelled with the corresponding letter or function, which can be any symbol corresponding to a required function, such as, for example but not limited to, an English character, a number, a special symbol, or a code of any input application. The mark on the keycap 13 has a transparent or semi-transparent design to form a light outputting area 131, so that the light emitted from the backlight module 20 can pass through the light outputting area 131 of the keycap 13. Thus, the user can view the outputted light and recognize the keycap 13.

Figure 4:
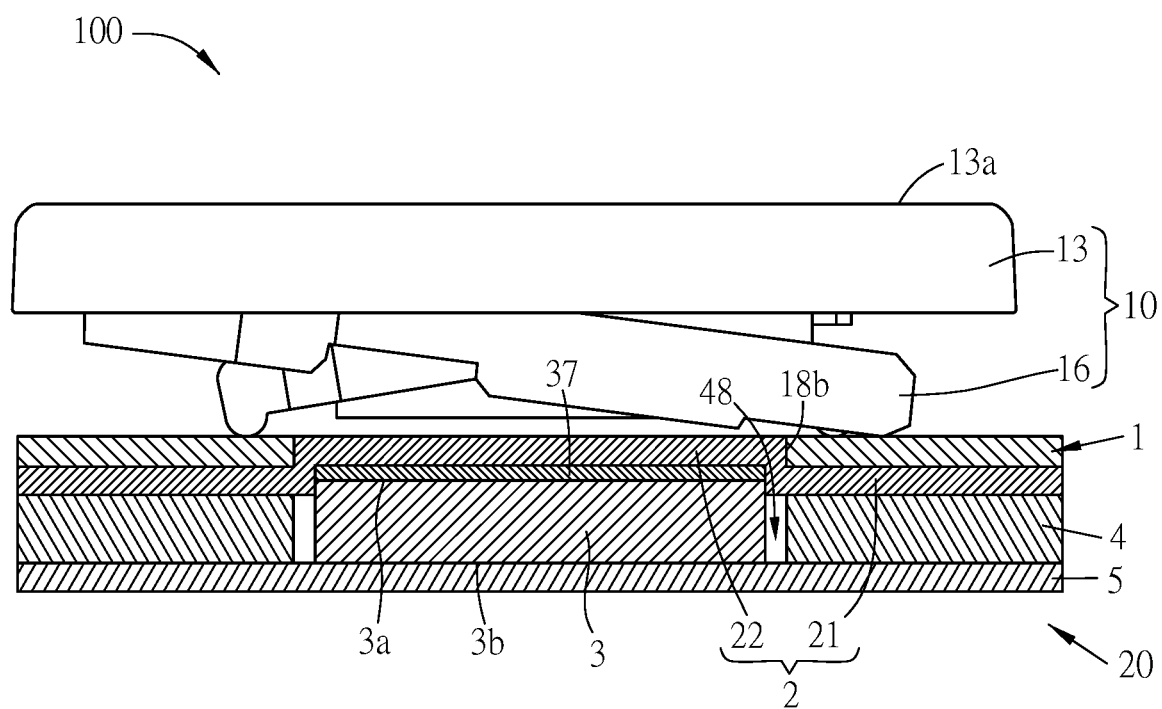
FIG. 4 is a partial sectional view of the illuminated keyboard according to an embodiment of this disclosure.
Figure 5:
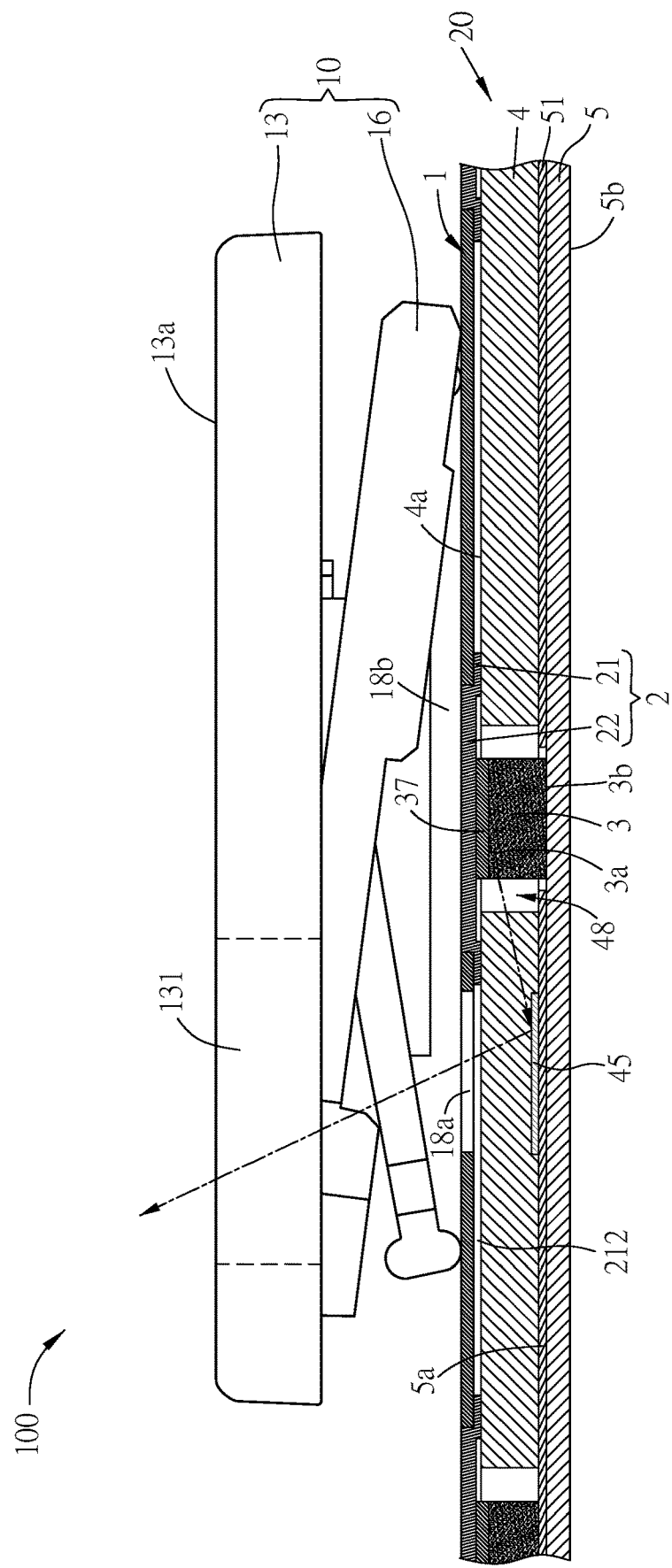
FIG. 5 is a partial sectional view of the illuminated keyboard according to an embodiment of this disclosure.

The structure of the illuminated keyboard of this disclosure will be further described with taking one keycap in FIG. 3 as an example in view of the sectional views shown in FIGS. 4 and 5 along the line A-A of FIG. 3.

An elastic assembly 16 (a scissor switch) is configured below the corresponding keycap 13 for supporting the keycap 13. A bottom plate 1 is disposed below the keyboard assembly 10, and the bottom plate 1 is located between the keyboard assembly 10 and the backlight module 20. The material of the bottom plate 1 can be, for example but not limited to, various metals (e.g. iron, stainless steel, nickel, or copper), resin, plastics, or rubber. In practice, the bottom plate 1 can be transparent or not. As shown in FIG. 4, the bottom plate 1 is configured with a plurality of openings 18b located under the keycaps 13. As shown in FIG. 5, in another aspect, the bottom plate 1 is configured with a plurality of openings 18a located under the keycaps 13 and a plurality of openings 18b corresponding to the light-emitting elements 3, which are configured corresponding to the keycaps 13, respectively. In this case, the opening 18b is positioned underneath the center of the corresponding keycap 13 for accommodating the light-emitting element 3. In this embodiment, each of the openings 18a and 18b can be a circular hole, a square hole, a polygonal hole, or any of other shapes.

The backlight module 20 is located under the keyboard assembly 10 and the bottom plate 1, and comprises a light shielding plate 2, a light guide plate 4, a plurality of light-emitting elements 3, and a circuit board 5. The backlight module 20 can be divided into a plurality of light-emitting units, and each light-emitting unit can comprise multiple light-emitting elements 3. In this embodiment, one keycap 13 corresponds to one light-emitting element 3.

The light shielding plate 2 comprises a planar region 21 and a plurality of convex regions 22. The planar region 21 is disposed between the bottom plate 1 and the light guide plate 4; and is configured with openings 212 corresponding to the light outputting areas 131 of the keycaps 13, respectively. Thus, the emitted light can pass through the openings and the corresponding light outputting areas 131 of the keycaps 13, and then be viewed by the users. The convex regions 22 are non-transparent, so that the convex regions 22 can block the emitted light. The convex regions 22 correspond to the openings 18b, respectively, and are located above the light-emitting elements 3, respectively, for accommodating the corresponding light-emitting elements 3. The light emitted from the upper light outputting surface 3a of the light emitting element 3 can be reflected by the convex region 22 of the light shielding plate 2, and then enters the light guide plate 4. Afterwards, the light traveling in the light guide plate 4 can be outputted through the opening 212. In this embodiment, the light shielding plate 2 has the properties of light shielding and reflecting.

Figure 6:
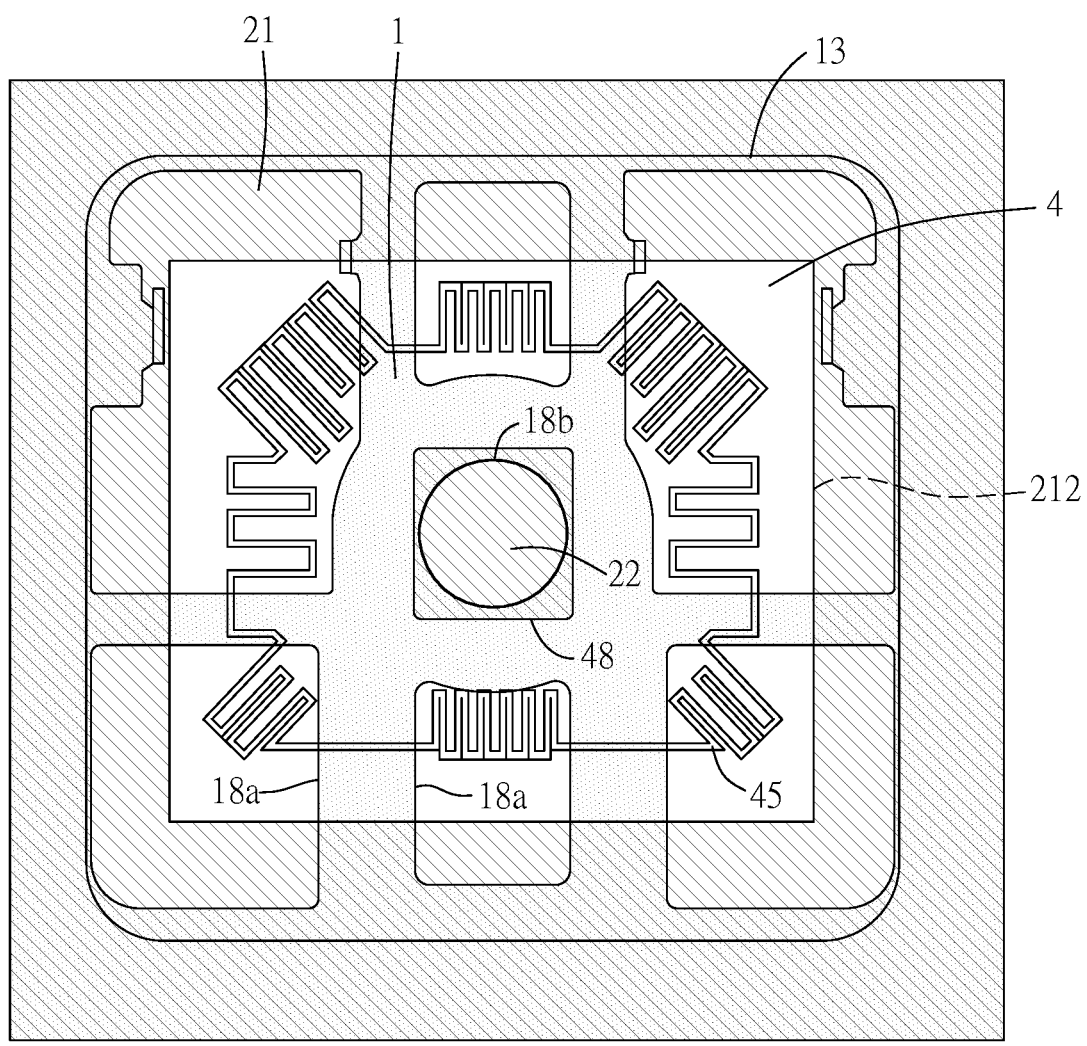
FIG. 6 is a top view of the keycap according to an embodiment of this disclosure.

FIG. 6 is a top view of the keycap according to an embodiment of this disclosure. A bottom plate 1, a light shielding plate 2, and a light guide plate 4 are disposed under the keycap 13 in order. The bottom plate 1 is configured with a circular opening 18b under the center of the keycap 13, and a plurality of openings 18a around the opening 18b. The light shielding plate 2 is formed with a convex region 22 corresponding to the opening 18b, and the residual part of the light shielding plate 2 forms a planar region 21. The planar region 21 is configured with an opening 212 for outputting light. The light guide plate 4 is configured with a through hole 48 below the convex region 22, and the light-emitting element 3 (not shown) is accommodated in the through hole 48. The light guide plate 4 is formed with a light guide pattern 45 corresponding to the opening 212 for assisting the light guiding. With reference to FIGS. 5 and 6, the opening 18b, the convex region 22 of the light shielding plate 2 and the light-emitting element 3 are located under the center of the keycap 13 in order, and the bottom plate 1 or the openings 18a, the planar region 21 and the opening 212 of the light shielding plate 2, and the light guide plate 4 are located under the periphery of the keycap 13 in order. The sizes of the light outputting area 131 and the corresponding opening 212 can be different for the corresponding keycap 13 in different dimensions and the different requirement of luminance, and the position and size of the opening 212 can be adjusted based on the required design.

Figure 7:
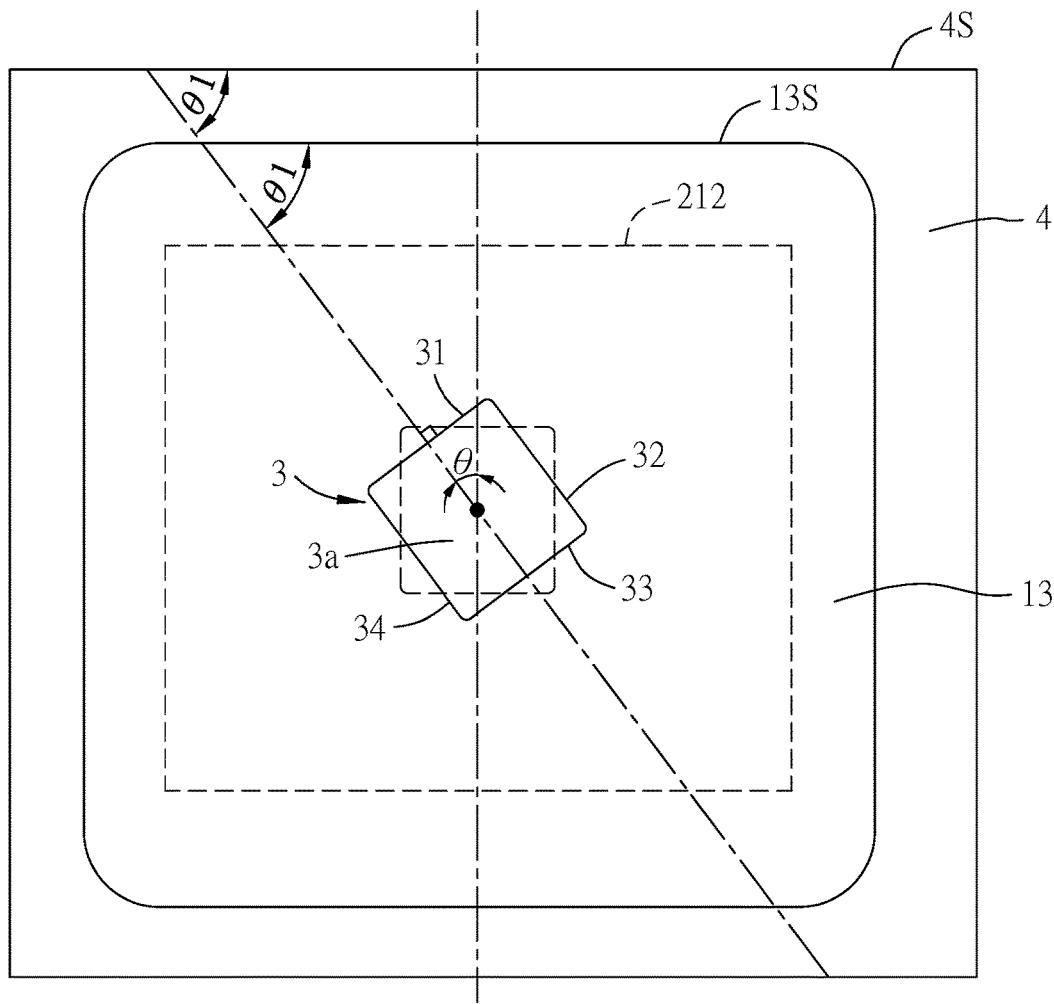
FIG. 7 is a schematic diagram showing the angle of the light-emitting element according to an embodiment of this disclosure.

In this embodiment, the light-emitting element 3 can be a rectangular or square light-emitting diode element, which comprises multiple light outputting surfaces. Referring to FIGS. 4, 5 and 7, the light-emitting element 3 has a cubic structure, which includes a first light outputting surface 31, a second light outputting surface 32, a third light outputting surface 33, a fourth light outputting surface 34, a top light outputting surface 3a, and a bottom surface 3b. Each of the first light outputting surface 31, the second light outputting surface 32, the third light outputting surface 33, and the fourth light outputting surface 34 is perpendicular to the top light outputting surface 3a and/or the bottom surface 3b.

As shown in FIG. 7, the top light outputting surface 3a of the light-emitting element 3 faces the top surface 13a of the keycap 13, and the first light outputting surface 31, the second light outputting surface 32, the third light outputting surface 33, and the fourth light outputting surface 34 are perpendicular to the top surface 13a of the keycap 13 and are located under the keycap 13. In one embodiment, the light-emitting element 3 is installed under the keycap 13 and is rotated for an angle θ, so that the light emitted from the light outputting surfaces 31~34 of the light-emitting element 3 can properly reach the corners of the keycap 13, thereby obtaining better light-emitting efficiency and light-emitting effect. The rotated angle θ is from about 30° to 60°, and preferably from about 30° to 55°. In addition, a normal direction of one of the light outputting surfaces of the light-emitting element 3 (e.g. the first light outputting surface 31) and a side 13S of the corresponding keycap 13 or a side 4S of the light guide plate 4 form an acute angle θ1. The rotated angle θ and the acute angle θ1 are complementary to each other (the sum of θ and θ1 is 90°). Thus, the acute angle θ1 is about between 30° and 60°, and preferably about between 35° and 60°.

In one embodiment, a reflection portion 37 is provided between the light-emitting element 3 and the convex region 22, and the reflection portion 37 is disposed above the light-emitting element 3 only. The reflection portion 37 is attached to the top light outputting surface 3a of the light-emitting element 3 for reflecting light emitted from the light-emitting element 3 and sending the light into the light guide plate 4. The reflection portion 37 can have a white color or any of other colors that are good for reflecting light. The reflection portion 37 can be individually provided, or it can be integrated with the light-emitting element 3. Accordingly, the light can be reflected back and forth in the light-emitting element 3, and then enters the light guide plate 4 through the surrounding light-outputting surfaces 31 to 34, thereby increasing the amount of light entering the light guide plate 4.

The light guide plate 4 is a sheet with a certain thickness, and comprises a lateral side 4S. The light guide plate 4 comprises a plurality of backlight regions 14a~14f corresponding to the keycap groups 11a~11f. For example, the light guide plate 4 comprises a first backlight region 14a and a second backlight region 14b. Each of the backlight regions comprises a plurality of keycap backlight areas, which are roughly located under the vertical projections of the keycaps 13, respectively. In this embodiment, the first backlight region 14a comprises a plurality of keycap backlight areas 141a, and the second backlight region 14b comprises a plurality of keycap backlight areas 141b. Each of the keycap backlight areas is configured with a through hole 48 corresponding to the light-emitting element 3 for accommodating the corresponding light-emitting element 3. The light-emitting element 3 protrudes from the through hole 48 and is accommodated in the accommodating space defined by the opening 18b of the bottom plate 1, the through hole 48 of the light guide plate 4, and the convex region 22 of the light shielding plate 2. The shape of the through hole 48 can be rectangular, square, circular, polygonal, irregular, or the likes, so that the light emitted from the light outputting surfaces 31~34 of the light-emitting element 3 can enter the multiple light inputting surfaces around the through hole 48, thereby achieving the proper light mixing effect. The light emitted from the light-emitting element 3 enters the light guide plate 4, and then travels within the light guide plate 4 via total internal reflection. Afterwards, the light is reflected by the light guiding pattern 45 and then outputted through the opening 212. The first light outputting surface 31, the second light outputting surface 32, the third light outputting surface 33 and the fourth light outputting surface 34 are perpendicular to the upper surface 4a of the light guide plate 4.

The circuit board 5 is disposed under the light guide plate 4 and comprises a first surface 5a facing the light guide plate 4 and a second surface 5b away from the light guide plate 4. In one embodiment, the first surface 5a is coated with a reflective layer 51, which is configured as a reflection and light shielding material for reflecting most light emitted from the light-emitting element 3 to the light guide plate 4. The through hole 48 of the light guide plate 4 is larger than the size of the light-emitting element 3, and the reflective layer 51 can be exposed from the through hole 48 of the light guide plate 4. The light-emitting element 3 can be disposed close to or contact against the reflective layer 51, so that the light can be reflected by the reflective layer 51 directly for increasing the light utility. The reflective layer 51 can have a white color or any of other colors that are good for reflecting light. The reflective layer 51 and the circuit board 5 can be integrated as one piece, so that the light inputting area can be flatter to reduce the loss when the light is inputted through the light inputting surfaces and to achieve the optimal use of the light. The circuit board 5 can be, for example but not limited to, a flexible printed circuit board (FPC).

Figure 8:
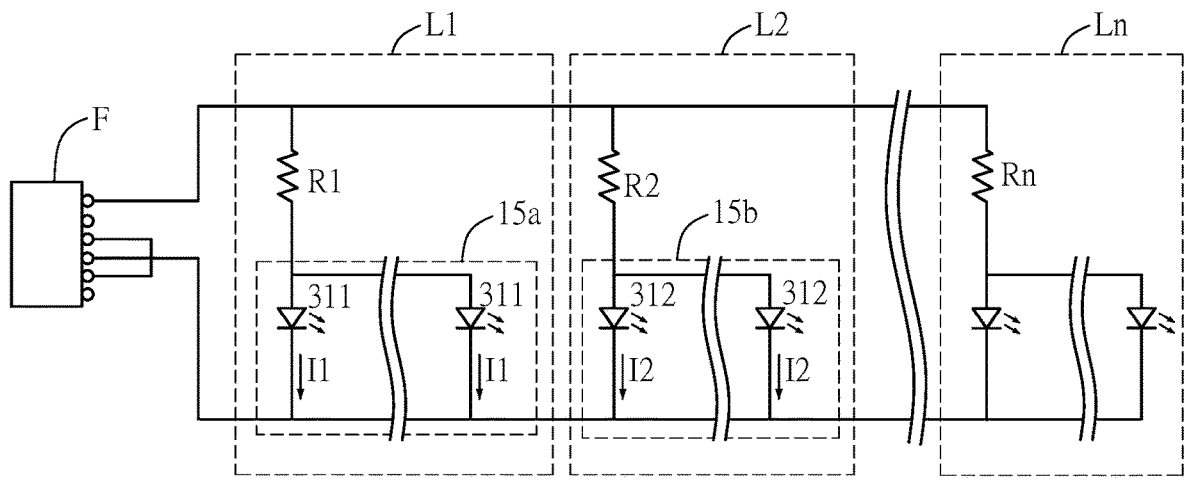
FIG. 8 is a schematic diagram showing the circuit design of the backlight module according to an embodiment of this disclosure.

FIG. 8 shows the circuit design of the illuminated keyboard of this disclosure. As shown in FIG. 8, the circuit on the circuit board 5 is composed of a plurality of light-emitting circuit blocks L1~Ln, which are electrically connected in parallel. The light-emitting circuit blocks L1~Ln correspond to the keycap groups 11a~11f of the illuminated keyboard 100, respectively.

Each of the light-emitting circuit blocks L1~Ln comprises at least one resistor and a plurality of light-emitting elements 3, and is further connected to the controller F. In this embodiment, the light-emitting elements 3 are electrically connected to each other in parallel to form the corresponding light-emitting unit. In addition, the light-emitting elements 3 are further connected to the resistor in series for performing the control operation of the corresponding block. In each light-emitting unit, the light-emitting elements 3 are connected in parallel and then connected to the resistor in series. In this embodiment, the number N of the light-emitting elements 3 is not equal to the number n of the resistor. In more specific, the number N of the light-emitting elements 3 is greater than the number n of the resistor.

The resistor can be a variable resistor or an equivalent resistor formed by multiple resistors. The method of dividing the circuit on the circuit board 5 into the light-emitting circuit blocks L1, L2 . . . Ln can refer to the light-emitting area of the keycaps that needs to be illuminated by each corresponding light-emitting unit, such as the keycap groups containing the keycaps in different sizes (e.g. the function keys, backspace key, and alphanumeric keys, etc.). Accordingly, the luminance performances of different areas can be controlled based on the division. In the first light-emitting circuit block L1, the first resistor R1 is connected to the first light-emitting unit 15a in series. In the second light-emitting circuit block L2, the second resistor R2 is connected to the second light-emitting unit 15b in series. The first light-emitting unit 15a, the second light-emitting unit 15b, the first resistor R1, and the second resistor R2 are arranged on the circuit board 5.

In one embodiment, the first light-emitting unit 15a is correspondingly used as the light source of the first keycap group 11a, and the second light-emitting unit 15b is correspondingly used as the light source of the second keycap group 11b. As shown in FIG. 2 in view of FIGS. 5 and 8, the first keycap group 11a comprises the function keys, which have the keycaps 13 with smaller top surfaces 13a (smaller total area of the light outputting areas 131), and the second keycap group 11b comprises the alphanumeric keys, which have the keycaps 13 with larger top surfaces 13a (larger total area of the light outputting areas 131). Accordingly, compared with the second light-emitting unit 15b, the first light-emitting unit 15a needs to be driven by a relatively larger current, so that the light-emitting elements 311 of the first light-emitting unit 15a can generate a larger luminous power than that generated by the light-emitting elements 312 of the second light-emitting unit 15b, thereby achieving a balanced luminance performance of the keyboard. Therefore, the entire keyboard can reach the optimum luminance uniformity while decreasing the cost. In addition, the number of the light-emitting elements 3 in each light-emitting unit can be changed based on the requirement of different divisions and designs.

In each keycap group, the area of the light outputting area 131 of each keycap 13 is defined as the light-emitting area. The total light-emitting area A1 of the first keycap group 11a corresponding to the first light-emitting unit 15a is equal to the sum of the light-emitting areas of all keycaps 13 in the first keycap group 11a, and the total light-emitting area A2 of the second keycap group 11b corresponding to the second light-emitting unit 15b is equal to the sum of the light-emitting areas of all keycaps 13 in the second keycap group 11b. The first total light-emitting area A1 is not equal to a second total light-emitting area A2. Specifically, the first total light-emitting area A1 is smaller than the second total light-emitting area A2.

The first backlight region 14a corresponding to the first keycap group 11a comprises a plurality of keycap backlight areas 141a, and the light emitted from the keycap backlight areas 141a can be outputted through the corresponding openings 212, respectively. The second backlight region 14b corresponding to the second keycap group 11b comprises a plurality of keycap backlight areas 141b, and the light emitted from the keycap backlight areas 141b can be outputted through the corresponding openings 212, respectively. In general, the larger the area of the top surface 13a of the keycap 13 is, the larger the area of the corresponding opening 212 is (in a proportional relationship).

In addition, the first total area A01 is the sum of the areas of the openings 212 corresponding to the keycap backlight areas 141a of the first backlight region 14a, the second total area A02 is the sum of the areas of the openings 212 corresponding to the keycap backlight areas 141b of the second backlight region 14b, and the first total area A01 is not equal to the second total area A02. Specifically, the first total area A01 is smaller than the second total area A02. Similarly, since the first total area A01 of the first backlight region 14a is smaller than the second total area A02 of the second backlight region 14b, the first light-emitting unit 15a needs to be driven by a relatively larger current than the second light-emitting unit 15b does, so that the light-emitting elements 311 of the first light-emitting unit 15a can generate a larger luminous power than that generated by the light-emitting elements 312 of the second light-emitting unit 15b, thereby achieving a balanced luminance performance of the keyboard.

In one embodiment, the resistance value of the resistor connected to the light-emitting unit in series can be adjusted to control the current. In practice, when the first total light-emitting area A1 of the first keycap group 11a is smaller than the second total light-emitting area A2 of the second keycap group 11b, or the first total area A01 corresponding to the first backlight region 14a is smaller than the second total area A02 corresponding to the second backlight region 14b, the resistance value of the first resistor R1 is set to be less than the resistance value of the second resistor R2. Accordingly, the first current I1 flowing through the light-emitting element 311 of the first light-emitting unit 15a is greater than the second current I2 flowing through the light-emitting element 312 of the second light-emitting unit 15b, so that the average luminance of the light-emitting element 311 of the first light-emitting unit 15a is greater than the average luminance of the light-emitting element 312 of the second light-emitting unit 15b. As the distance between the circuit on the circuit board and the power supply (not shown) is longer, the current will decrease due to the loss caused by the circuit impedance. Therefore, the resistors with different resistance values can be selected and connected in series to adjust the resistances as well as the currents in different areas.

As mentioned above, in the illuminated keyboard 100 of some embodiments, the light-emitting elements 3 are accommodated in the accommodating space defined by the opening 18b of the bottom plate 1, the through hole 48 of the light guide plate 4, and the convex region 22 of the light shielding plate 2, so that the thickness of the entire structure can be reduced. In addition, different circuit blocks are designed for different keycap groups with different light-emitting areas, so that the required components can be simplified and reduced. Compared with the conventional art, the illuminated keyboard and the backlight module of this disclosure have a novel structure and circuit design in cooperated with the corresponding control method, thereby achieving a thinner profile, an increased luminance, and more uniform light coupling. Accordingly, this disclosure can decrease the power consumption and achieve the effect of thin structure.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An illuminated keyboard, comprising:
a first keycap group;
a second keycap group, wherein each of the first keycap group and the second keycap group comprises a plurality of keycaps;
a bottom plate disposed under the first keycap group and the second keycap group; and
a backlight module, comprising:
a first light-emitting unit comprising a plurality of light-emitting elements, wherein the light-emitting elements of the first light-emitting unit are disposed under the keycaps of the first keycap group, respectively, and the light-emitting elements of the first light-emitting unit are electrically connected to each other in parallel,
a second light-emitting unit comprising a plurality of light-emitting elements, wherein the light-emitting elements of the second light-emitting unit are disposed under the keycaps of the second keycap group, respectively, and the light-emitting elements of the second light-emitting unit are electrically connected to each other in parallel,
a first resistor electrically connected to the first light-emitting unit in series,
a second resistor electrically connected to the second light-emitting unit in series,
a light guide plate configured with a plurality of through holes,
a light shielding plate comprising a planar region and a plurality of convex regions, and
a circuit board disposed under the light guide plate, wherein the first light-emitting unit, the second light-emitting unit, the first resistor and the second resistor are disposed on the circuit board;
wherein, a first total light-emitting area of the first keycap group is not equal to a second total light-emitting area of the second keycap group,
wherein the bottom plate is configured with a plurality of openings corresponding to the keycaps and the light-emitting elements respectively, the through holes correspond to the openings, respectively, wherein the planar region is disposed between the bottom plate and the light guide plate, and the convex regions correspond to the openings, respectively, wherein, the light-emitting elements of the first light-emitting unit and the second light-emitting unit are accommodated in accommodating spaces defined by the openings, the through holes and the convex region, respectively.

2. The illuminated keyboard of claim 1, wherein when the first total light-emitting area is less than the second total light-emitting area, a first current flowing through the light-emitting elements of the first light-emitting unit is greater than a second current flowing through the light emitting-elements of the second light-emitting unit.

3. The illuminated keyboard of claim 1, wherein when the first total light-emitting area is less than the second total light-emitting area, a resistance value of the first resistor is less than a resistance value of the second resistor.

4. The illuminated keyboard of claim 1, wherein when the first total light-emitting area is less than the second total light-emitting area, an average luminance of the light-emitting elements of the first light-emitting unit is greater than an average luminance of the light-emitting elements of the second light-emitting unit.

5. The illuminated keyboard of claim 1, wherein an amount of the light-emitting elements in the first light-emitting unit or the second light-emitting unit is greater than an amount of the resistors connecting to the light-emitting elements in series.

6. The illuminated keyboard of claim 1, wherein each of the light-emitting elements comprises a plurality of light outputting surfaces perpendicular to a top surface of a corresponding keycap of the keycaps.

7. The illuminated keyboard of claim 6, wherein the light outputting surfaces comprise a first light outputting surface, a normal direction of the first light outputting surface and a side of the corresponding keycap of the keycaps form an acute angle, and the acute angle is between 35° and 60°.

8. The illuminated keyboard of claim 1, wherein a reflection portion is provided between a light-emitting element of the light-emitting elements and a convex region of the convex regions, and the reflection portion is disposed above the light-emitting element for reflecting light emitted from the light-emitting element.

9. The illuminated keyboard of claim 1, wherein the circuit board comprises a reflective layer facing the light guide plate for reflecting a part of light emitted from the light-emitting element to the light guide plate, and the reflective layer is exposed from the through hole.

10. A backlight module, comprising:
a light guide plate comprising a side, a first backlight region and a second backlight region, wherein each of the first backlight region and the second backlight region comprises a plurality of keycap backlight areas, each of the keycap backlight areas is configured with a through hole;
a first light-emitting unit comprising a plurality of light-emitting elements, wherein the light-emitting elements of the first light-emitting unit are disposed corresponding to the through holes in the keycap backlight areas of the first backlight region, respectively, and the light-emitting elements of the first light-emitting unit are electrically connected to each other in parallel;
a second light-emitting unit comprising a plurality of light-emitting elements, wherein the light-emitting elements of the second light-emitting unit are disposed corresponding to the through holes in the keycap backlight areas of the second backlight region, respectively, and the light-emitting elements of the second light-emitting unit are electrically connected to each other in parallel;
a first resistor electrically connected to the first light-emitting unit in series;
a second resistor electrically connected to the second light-emitting unit in series;
a circuit board disposed under the light guide plate, wherein the first light-emitting unit, the second light-emitting unit, the first resistor and the second resistor are disposed on the circuit board; and
a light shielding plate comprising a planar region and a plurality of convex regions, wherein the planar region is configured with a plurality of openings for outputting light, and the light-emitting elements are disposed corresponding to the convex regions, respectively;
wherein, a first total area of the openings corresponding to the keycap backlight areas of the first backlight region is not equal to a second total area of the openings corresponding to the keycap backlight areas of the second backlight region,
wherein each of the light-emitting elements comprises a plurality of light outputting surfaces perpendicular to an upper surface of the light guide plate,
wherein the light outputting surfaces comprise a first light outputting surface, a normal direction of the first light outputting surface and the side of the light guide plate form an acute angle, and the acute angle is between 35° and 60°.

11. The backlight module of claim 10, wherein when the first total area is less than the second total area, a first current flowing through the light-emitting elements of the first light-emitting unit is greater than a second current flowing through the light emitting-elements of the second light-emitting unit.

12. The backlight module of claim 10, wherein when the first total area is less than the second total area, a resistance value of the first resistor is less than a resistance value of the second resistor.

13. The backlight module of claim 10, wherein when the first total area is less than the second total area, an average luminance of the light-emitting elements of the first light-emitting unit is greater than an average luminance of the light-emitting elements of the second light-emitting unit.

14. The backlight module of claim 10, wherein an amount of the light-emitting elements in the first light-emitting unit or the second light-emitting unit is greater than an amount of the resistors connecting to the light-emitting elements in series.

15. The backlight module of claim 10, wherein a reflection portion is provided between a light-emitting element of the light-emitting elements and a convex region of the convex regions, and the reflection portion is disposed above the light-emitting element for reflecting light emitted from the light-emitting element.

16. The backlight module of claim 10, wherein the light-emitting elements of the first light-emitting unit and the second light-emitting unit protrude from the through holes, respectively, and are accommodated in accommodating spaces defined by the through holes and the convex regions, respectively.

17. The backlight module of claim 10, wherein the circuit board comprises a reflective layer facing the light guide plate for reflecting a part of light emitted from the light-emitting element to the light guide plate, and the reflective layer is exposed from the through hole.

18. A backlight module, comprising:
- a light guide plate comprising a side, a first backlight region and a second backlight region, wherein each of the first backlight region and the second backlight region comprises a plurality of keycap backlight areas, each of the keycap backlight areas is configured with a through hole;
- a first light-emitting unit comprising a plurality of light-emitting elements, wherein the light-emitting elements of the first light-emitting unit are disposed corresponding to the through holes in the keycap backlight areas of the first backlight region, respectively, and the light-emitting elements of the first light-emitting unit are electrically connected to each other in parallel;
- a second light-emitting unit comprising a plurality of light-emitting elements, wherein the light-emitting elements of the second light-emitting unit are disposed corresponding to the through holes in the keycap backlight areas of the second backlight region, respectively, and the light-emitting elements of the second light-emitting unit are electrically connected to each other in parallel;
- a first resistor electrically connected to the first light-emitting unit in series;
- a second resistor electrically connected to the second light-emitting unit in series;
- a circuit board disposed under the light guide plate, wherein the first light-emitting unit, the second light-emitting unit, the first resistor and the second resistor are disposed on the circuit board; and
- a light shielding plate comprising a planar region and a plurality of convex regions, wherein the planar region is configured with a plurality of openings for outputting light, and the light-emitting elements are disposed corresponding to the convex regions, respectively;
- wherein, a first total area of the openings corresponding to the keycap backlight areas of the first backlight region is not equal to a second total area of the openings corresponding to the keycap backlight areas of the second backlight region,
- wherein a reflection portion is provided between a light-emitting element of the light-emitting elements and a convex region of the convex regions, and the reflection portion is disposed above the light-emitting element for reflecting light emitted from the light-emitting element.

19. The backlight module of claim 18, wherein when the first total area is less than the second total area, a first current flowing through the light-emitting elements of the first light-emitting unit is greater than a second current flowing through the light emitting-elements of the second light-emitting unit.

20. The backlight module of claim 18, wherein when the first total area is less than the second total area, a resistance value of the first resistor is less than a resistance value of the second resistor.

* * * * *